Patented May 26, 1936

2,042,333

UNITED STATES PATENT OFFICE 2,042,333

PROCESS FOR THE PRESERVATION OF RUBBER

Mayne R. Coe, Washington, D. C.

No Drawing. Application December 18, 1933, Serial No. 703,029

2 Claims. (Cl. 18—50)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without payment to me of any royalty thereon.

This invention relates to the art of preserving rubber, rubber compounds, and all articles containing rubber against deterioration due to aging and/or oxidation, having for its object to provide a method of treatment which is simple to carry out and more efficient in results than those heretofore proposed.

With these and other objects in view the invention resides in the novel steps and combinations of steps constituting the method, as well as in the novel product produced thereby, as will be disclosed more fully hereinafter and particularly pointed out in the claims.

It is well known that rubber, rubber compounds and articles containing rubber are subject to decay, dry rot, cracking, hardening, loss of elasticity, loss of resiliency when stretched and when under constant strain, graininess etc. due to added pigments, and other inherent qualities, all of which greatly impair the usefulness of the rubber product. Deterioration of rubber and its products is due in great part to oxidation, and I have found that this deterioration is due to the effect of certain wave-lengths of light occasioned by the photochemical action on certain reactive substances in the rubber. These active wave-lengths of light, in so far as rubber deterioration is concerned, may be eliminated by the use of protective materials having the faculty of excluding or absorbing them, which materials may or may not be transparent.

My experiments have disclosed that green protective material is highly effective in preventing, or retarding the progress of, oxidation or deterioration of rubber and products containing rubber. Other colors are either wholly ineffective, or only partially effective, as for example red. Furthermore, those colors transparent to wave-lengths of light other than certain shades of green and to some extent red, induce photochemical reactions resulting in rubber decay or oxidation. All greens are not entirely successful, my experiments showing that the exclusion or reduction of all wave-lengths of light except those subject to transmission through a green screen or protective material lying approximately between 4900 and 5600 Angstrom units of the spectrum, prevents or retards greatly the progress of oxidation of rubber and goods made of rubber, 5400 Angstrom units being the most effective wave-length for this preserving.

It is believed that the reason why this range of green is so effective in preventing deterioration is because these shades approximate chlorophyll green or plant green. Photosynthesis, being dependent on the green portion of the plant engendering growth, produces within the plant aldehydes, ketones, and peroxides from the carbon dioxide of the air, with the evolution of oxygen. In the deterioration of rubber those same substances are evolved that are formed within the plant, with the fixation of oxygen, due to wave-lengths of light other than green. It is therefore concluded that rubber, being a plant substance formed in nature by photosynthesis, would be protected from deterioration of chlorophyll green, since this color would and does act as a protector in that it does not promote photochemical actions which are considered to cause oxidation. This deterioration of rubber suggests a reversible photochemical reaction with reference to photosynthesis found in nature.

Preservation may be accomplished by enclosing the product within a protective screen such as a green wrapper or foil coating whereby the particular wave-lengths above described, causing deterioration of rubber and articles containing rubber, are absorbed or excluded. This preservation may also be accomplished by incorporating the protective substance in the rubber mix, such as a green dye or pigment having the spectral light transmission of chlorophyll green, characteristic of the foliage of the rubber tree, in liquid or other form, foil, powdered metal, or any material capable of absorbing or excluding the injurious wave-lengths and insoluble in the rubber mix. When certain powdered metal or foil is added to the rubber mix, the wearing quality of the rubber is enhanced, the metal also in some cases acting as a heat repellant. Also the rubber and articles containing rubber may be protected during the gathering of the sap or during the process of manufacture by a screen housing, or other means, which serves to keep out those particular wave-lengths of light which cause deterioration attributive to oxidation or otherwise. In addition this preservation may be brought about by coating rubber or articles containing rubber with a flexible or hard material, such as a green varnish or coating.

By chlorophyll green is meant any green pigment having the spectral transmission of the green pigment in plants and having approximately a spectral transmission beginning with 5270 to and including 6500 Angstrom units of the visible spectrum.

While chlorophyll green as above defined may in some instances admit some red and yellow light rays, the red rays admitted are harmless and the yellow rays transmitted are insufficient in intensity or energy to do any appreciable harm.

Having fully disclosed my discovery I claim:

1. The process of preserving rubber and articles containing rubber which comprises combining with the rubber, chlorophyll green in such a manner and amount as to exclude from the rubber and such articles, all wave-lengths of light except those subject to transmission through a color screen having a spectral transmission of the wave lengths lying between 5270 and 6500 Angstrom units of the spectrum.

2. The process of preserving rubber and articles containing rubber which comprises enclosing the product in a protective screen containing chlorophyll green in a sufficient amount to exclude from such rubber and articles all light except that having wave-lengths lying between 5270 and 6500 Angstrom units of the spectrum.

MAYNE R. COE.

CERTIFICATE OF CORRECTION.

Patent No. 2,042,333.   May 26, 1936.

MAYNE R. COE.

It is hereby certified that error appears in the printed specification of the above numbered patent requiring correction as follows: Page 1, second column, line 17, for "of" read by; and that the said Letters Patent should be read with this correction therein that the same may conform to the record of the case in the Patent Office.

Signed and sealed this 4th day of August, A. D. 1936.

(Seal)

Henry Van Arsdale
Acting Commissioner of Patents.